Figure 1:
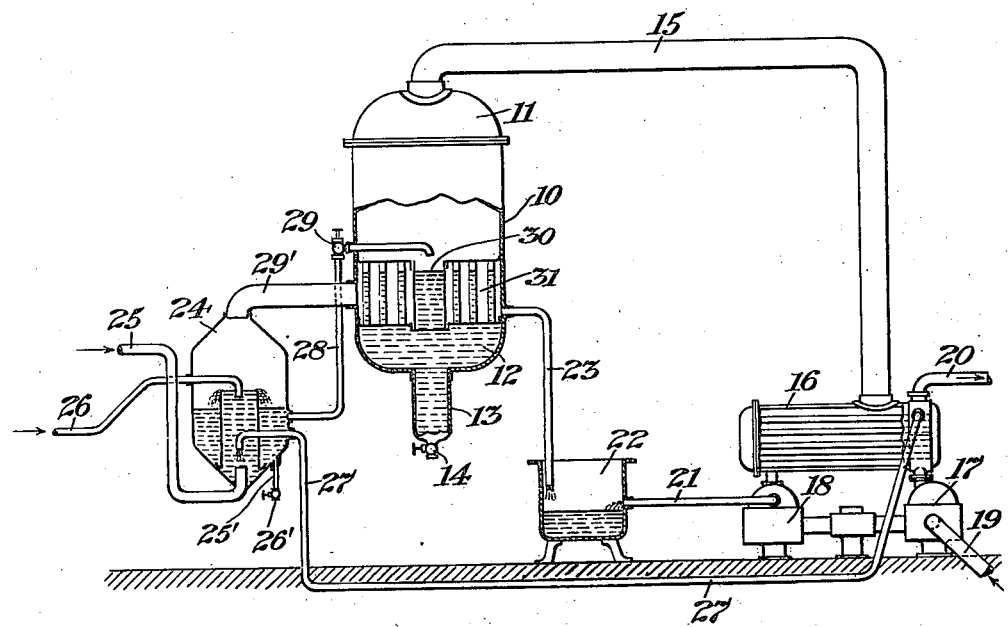

June 17, 1924.

E. W. CHRISTIE

EVAPORATOR

Filed Dec. 19, 1921

1,498,350

INVENTOR
Evi W. Christie
BY
HIS ATTORNEYS

Patented June 17, 1924.

1,498,350

UNITED STATES PATENT OFFICE.

EVI W. CHRISTIE, OF SEWAREN, NEW JERSEY, ASSIGNOR TO WHEELER CONDENSER & ENGINEERING COMPANY, OF CARTERET, NEW JERSEY, A CORPORATION OF NEW JERSEY.

EVAPORATOR.

Application filed December 19, 1921. Serial No. 523,273.

*To all whom it may concern:*

Be it known that I, EVI W. CHRISTIE, a citizen of the United States, residing in Sewaren, in the county of Middlesex and State of New Jersey, have invented an Improvement in Evaporators, of which the following is a specification.

In distilling water in the various types of apparatus which are now employed for this purpose, there is a tendency of the impurities in the water to be distilled to form a scale on the heating surface which, in some instances, accumulates rapidly, and obviously as the accumulation of this scale increases, the efficiency of the apparatus decreases. This is true to such an extent that in all types of evaporators, with which I have heretofore become acquainted, it has been necessary, at least at predetermined intervals, to interrupt the operation of the evaporator for the purpose of cleaning the scale from the heating surface.

The object of my invention is to overcome this difficulty, and in so doing I propose to employ an evaporating apparatus consisting of one or more evaporators which may be of any desired type, and a closed vessel or receptacle to which the raw water or other fluid to be evaporated is fed and to which steam for the purpose of evaporating the raw water is blown directly into the same in this closed vessel; and to the mixture of steam and raw water in the closed vessel or receptacle there is also admitted and added a reagent of any nature which will precipitate the impurities in the water or liquid to be evaporated so that these impurities as precipitated, or at predetermined intervals, may be withdrawn from the closed vessel. Furthermore, the proportion of the raw water to the steam admitted to the closed vessel per unit of time is such as to raise the water to the boiling point so that the pressure in the closed vessel is substantially atmospheric and there is no accumulation of heat in the closed vessel, any excess heat that there may be being utilized for blowing down the sludge. The liquid in the closed vessel, after the impurities are thus precipitated therefrom, is conveyed to the evaporator and any impurities that may be still left in the liquid are only in the nature of a slime and as such may be drawn off from the evaporator, while the vapors from the closed vessel are carried to the evaporator in the usual manner and are condensed by the liquid which is conveyed to the evaporator, as hereinbefore stated. It will be apparent, therefore, that in carrying out the invention the evaporator apparatus may be used continuously because of the absence of scale accumulations on the heating surface thereof which are prevented by the removal of the greater portion, at least, of the scale forming materials from the liquid before the same is conveyed to the evaporator and the heating surface of the evaporator maintained in an efficiently clean condition by merely drawing off the slime which may exist in the liquid after the same has been conveyed to the evaporator.

Figure 2:
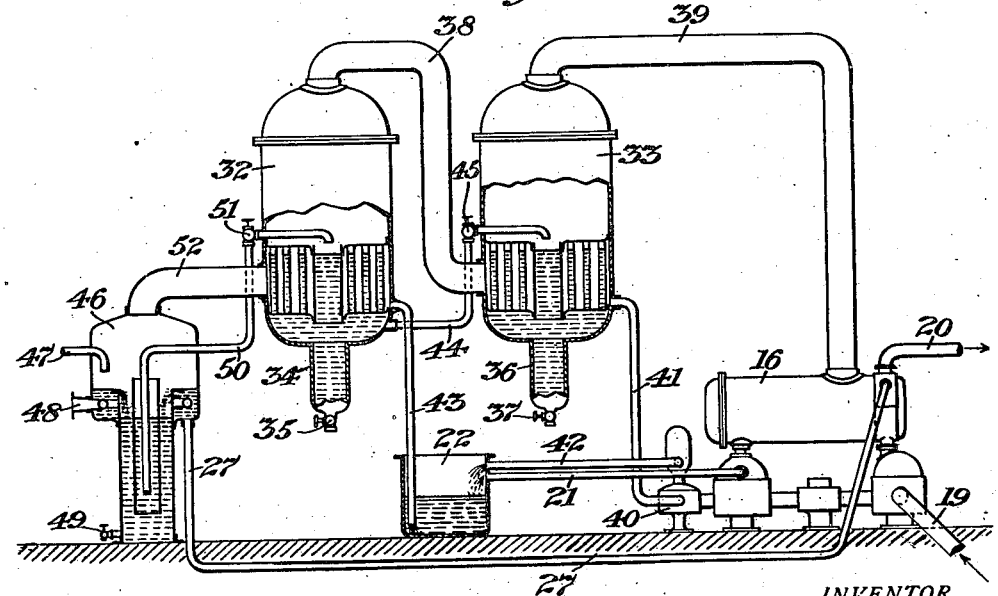

In the drawing:

Fig. 1 represents diagrammatically an evaporator apparatus comprising my present invention and in which a single evaporator is employed, and Fig. 2 is a similar view showing the form the invention may take in a two stage evaporator apparatus.

Referring to the drawing, and particularly to Fig. 1, in carrying out the invention I employ an evaporator, the body portion of which is indicated at 10. As is customary this body portion of the evaporator is fitted with a cap 11 and a base 12 suitably connected thereto and supported in any desired manner. Extending from the base 12 there is a well 13 having a drain cock or valve 14 fitted at the extremity thereof. The interior of the evaporator communicates, by way of a pipe 15, with the interior of a surface condenser 16. As is customary, this surface condenser is mounted on a circulating pump 17 and an air or vacuum pump 18, these pumps being operated by steam or otherwise as is also customary. The suction to the circulating pump is indicated at 19 and the discharge therefrom at 20. The suction of the air pump is connected to the interior of the condenser, while the discharge from the air pump is connected by a pipe 21 to a well or tank 22. Discharging into this tank 22 is also a pipe 23 by which the condensate from the evaporator escapes to the tank.

Associated with the evaporator, I employ a closed vessel which is diagrammatically indicated at 24. This vessel operates as an auxiliary evaporator or tank. Connected to the vessel 24 is a pipe 25 for the admission of steam to the vessel, and also leading into the vessel 24 is a pipe 26 for the admission of a reagent thereto. As indicated in the drawing, the water to be distilled or evaporated is taken from the circulating supply to the condenser and a pipe 27 for this purpose is connected at one end adjacent the circulating discharge of the condenser and at the other end is carried into the vessel 24. The interior of the vessel 24 communicates with the interior of the evaporator by a pipe 28 in which there is fitted a valve 29. The interior of the vessel 24 also communicates with the interior of the condensate chamber within the body of the evaporator by means of a pipe 29'. The liquid from the vessel 24 is conveyed by the water pipe 28 to the interior or space 30 within the body of the evaporator, while the vapors from the vessel 24 pass by way of the pipe 29' to the condensing space 31 in the body of the evaporator. In this apparatus the raw water to be evaporated or distilled in predetermined quantities is taken from the circulating supply and fed through the pipe 27 to the closed vessel 24 into which a predetermined quantity of steam per unit of water is also admitted through the pipe 25, while through the pipe 26 there is admitted to the closed vessel 24 a predetermined quantity of the necessary reagent. The ratio between the steam and the water thus admitted per unit of time is sufficient to raise the water to the boiling point and to maintain a substantially atmospheric pressure in the closed vessel, while the reagent admitted is of the necessary nature and quantity to precipitate the impurities in the raw water or other liquid, the precipitate being drawn off at predetermined intervals through a drain pipe 25', the control of the flow through which is regulated by a valve or cock 26'. The vacuum created in the condenser by the operation of the air pump extends, of course, to the interior of the evaporator and the water or liquid in the closed vessel, after the impurities have been precipitated therefrom, is conveyed by the pipe 28 to the interior of the evaporator, while the vapors from the liquid in the closed vessel are carried by the pipe 29' to the condensing chamber in the evaporator where these vapors are condensed by the liquid as contained in the evaporator and the condensate discharged by way of the pipe 23 to the tank 22. The vapors arising from the liquid in the evaporator are carried by way of the pipe 15 to the condenser 16 in which they are condensed, and together with the non-condensable vapors are delivered by way of the air pump 18 and pipe 21 to the tank 22. The condition of the water or other liquid after reaching the evaporator is such that any impurities which may still remain in the same are in the form of a slime which settles to the well 13 at the base of the evaporator and may be withdrawn therefrom by way of the valve or cock 14 so that the formation of scale on the heating surface of the evaporator is practically eliminated making it unnecessary to interrupt the operation of the evaporator for the removal of the scale. It is furthermore to be noted that the ratio between the water and steam supply to the closed vessel is such that there is no excess heat developed except that which may be employed as a means of blowing down the sludge, so that there is no accumulation of heat.

Referring to Fig. 2 of the drawing, I have illustrated the application of the invention to a multiplicity of evaporators in which, as shown, two evaporators are utilized. One of these evaporators is indicated at 32 and the other at 33. The evaporator 32 is provided with a well 34 and discharge valve 35 in the base thereof, and similarly the evaporator 33 is provided with a well 36 and a discharge valve 37 in the base thereof. The interior of the evaporator 32 communicates with the condensing chamber in the evaporator 33 by way of a pipe 38, and the interior of the evaporator 33 communicates with the interior of the surface condenser by way of a pipe 39. In this type of apparatus the pumps include an additional or auxiliary air pump 40, the suction of which is connected by a pipe 41 with the condensing chamber of the evaporator 33, while the discharge from the auxiliary air pump 40 is connected by a pipe 42 to the tank 22. Discharging into this tank 22 there is also a pipe 43 from the condensing chamber of the evaporator 32. The interior of the evaporator 32 communicates with the interior of the evaporator 33 by way of a pipe 44 in which there is fitted a valve or cock 45. In this structure the closed vessel is indicated at 46. The closed vessel is fitted with a pipe connection 47 for the admission of the reagent and a pipe connection 48 for the admission of the steam, while at the base of the closed vessel 46 there is a discharge connection fitted with a valve 49. The interior of the closed vessel 46 beneath the liquid level therein communicates with the interior of the evaporator 32 by means of a pipe 50 in which there is fitted a valve 51, while the upper portion of the interior of the closed vessel 46 or the vapor chamber thereof communicates with the condensing chamber of the evaporator 32 by means of a pipe 52. The operation of the apparatus in which two or more evaporators are employed is similar in all respects to that hereinbefore described in connection with the form of invention shown in Fig. 1 in which there is but a single evaporator, it being understood, of course, that the ratio between the water and steam admitted to the closed vessel will vary with the number of evaporators employed as well as other operating conditions.

I claim as my invention:

1. An evaporating apparatus including an evaporator having a vapor chamber and a condenser chamber, a closed vessel having a unitary compartment, means for admitting a liquid, a quantity of steam and a reagent to the unitary compartment of the said closed vessel thereby permitting the said liquid, steam and reagent to comingle therein to precipitate the impurities in the liquid, means for conveying the purified liquid from the said closed vessel to the evaporator compartment of the evaporator, and means for conveying the vapors from the said closed vessel to the vapor compartment of the said evaporator.

2. An evaporating apparatus including an evaporator having a liquid compartment and a vapor compartment, a closed vessel having a unitary compartment, means for conveying a liquid to be evaporated to the closed vessel, means for conveying a quantity of steam to the closed vessel, means for conveying a reagent to the said closed vessel wherein the said liquid, steam and reagent are permitted to comingle to precipitate the foreign matter in the said liquid to be evaporated, a connection from the closed vessel to the liquid compartment of the evaporator, and a connection from the said closed vessel to the vapor compartment of the evaporator.

3. An evaporating apparatus including an evaporator having a liquid compartment and a vapor compartment therein, a closed vessel having a unitary compartment therein, means for conveying a liquid to be evaporated to the compartment in the closed vessel, means for conveying steam to the compartment in the closed vessel, means for conveying a reagent to the compartment in the closed vessel wherein the said liquid, steam and reagent are permitted to comingle to precipitate the foreign matter in the liquid to be evaporated, means for conveying the purified liquid from the compartment in the closed vessel to the liquid compartment in the evaporator, means for conveying the vapors from the compartment in the closed vessel to the vapor compartment in the evaporator, a condenser, and means for conveying the vapors from the evaporator to the condenser.

4. An evaporating apparatus comprising an evaporator, a surface condenser, means for providing communication between the evaporator and the surface condenser, a closed vessel, means for supplying steam to the closed vessel, means for connecting the discharge of the water circulating end of the condenser to the said closed vessel to convey a predetermined quantity of the circulating water to the closed vessel to be evaporated, means for admitting a reagent to the closed vessel to precipitate the foreign matter in the water to be evaporated, means for conveying the water from the closed vessel to the interior of the evaporator, and means for conveying vapors from the closed vessel to the condensing chamber of the evaporator.

5. An evaporating apparatus comprising an evaporator, a surface condenser, means for providing communication between the evaporator and the surface condenser, a closed vessel, means for supplying steam to the closed vessel, means for connecting the discharge of the water circulating end of the condenser to the said closed vessel to convey a predetermined quantity of the circulating water to the closed vessel to be evaporated, means for admitting a reagent to the closed vessel to precipitate the foreign matter in the water to be evaporated, a connection for drawing off the precipitate from the closed vessel, devices for draining the evaporator, means for conveying the water from the closed vessel to the interior of the evaporator, and means for conveying vapors from the closed vessel to the condensing chamber of the evaporator.

6. An evaporating apparatus comprising a plurality of evaporators, a condenser, a closed vessel, a connection from one evaporator to the condensing chamber of another evaporator, a connection from an evaporator to the condenser, a connection from the interior of one evaporator to the next evaporator, means for admitting steam to the closed vessel, means for conveying a portion of the circulating water from the discharge end of the circulating system of the condenser to the interior of the said closed vessel, means for admitting a reagent to the said closed vessel to precipitate the foreign matter from the water supplied thereto, a connection from the interior of the closed vessel to the interior of the first aforesaid evaporator, and a connection from the said closed vessel to the condensing chamber of the first aforesaid evaporator.

7. An evaporating apparatus comprising two evaporators, a condenser and a closed vessel, a connection between the first evaporator and the condensing chamber of the second evaporator, a connection between the second evaporator and the condenser, a connection between the interior of the first and second evaporator, a discharge from the condensing chambers of the said evaporators, means for admitting steam to the said closed vessel, a connection from the discharge end of the circulating system of the condenser to the interior of the said closed vessel for supplying a predetermined quantity of water thereto to be evaporated, a connection for admitting a reagent to the closed vessel to precipitate the foreign matter in the water supplied thereto, a connection from the interior of the said closed vessel to the first evaporator, and a connection from the said closed vessel to the condensing chamber of the first evaporator.

8. An evaporating apparatus comprising two evaporators, a condenser, a closed vessel, a connection between the first evaporator and the condensing chamber of the second evaporator, a connection between the second evaporator and the condenser, a connection between the interior of the first and second evaporator, a discharge from the condensing chambers of the said evaporators, means for admitting steam to the said closed vessel, a connection from the discharge end of the circulating system of the condenser to the interior of the said closed vessel for supplying a predetermined quantity of water thereto to be evaporated, a connection for admitting a reagent to the closed vessel to precipitate the foreign matter in the water supplied thereto, a device for drawing off the precipitate from the said closed vessel, devices for draining the said evaporators from the lower ends thereof, a connection from the interior of the said closed vessel to the first evaporator, and a connection from the said closed vessel to the condensing chamber of the first evaporator.

9. An evaporating apparatus including an evaporator having a liquid compartment and a vapor compartment, a closed vessel, means for admitting a liquid to be evaporated, a heating agent, and a reagent to the unitary compartment of the closed vessel permitting the said liquid, the heating agent and the reagent to comingle in the unitary compartment of the closed vessel to precipitate the impurities in the said liquid, means for conveying the liquid thus purified from the compartment in the closed vessel to the liquid compartment of the evaporator, and means for conveying the vapors from the compartment in the closed vessel to the vapor compartment of the evaporator.

Signed by me this 13 day of December, 1921.

EVI W. CHRISTIE.